United States Patent [19]
Ilg

[11] Patent Number: 5,366,349
[45] Date of Patent: Nov. 22, 1994

[54] AUTOMATIC LIQUID PUMP WITH VAPOR FLOW PREVENTION FLOW OUTLET VALVE

[75] Inventor: Edmond Ilg, Ridgefield Park, N.J.
[73] Assignee: Gestra, Inc., West Caldwell, N.J.
[21] Appl. No.: 83,650
[22] Filed: Jun. 25, 1993
[51] Int. Cl.$^5$ .............................. F04F 1/06; F04B 21/02
[52] U.S. Cl. ..................... 417/132; 417/135; 137/399
[58] Field of Search ............... 417/297.5, 126, 127, 417/128, 129, 130, 131, 132, 133, 134, 135, 136; 137/399, 192

[56] References Cited

U.S. PATENT DOCUMENTS

| | | | |
|---|---|---|---|
| 1,767,452 | 6/1930 | Hewitt | 417/131 |
| 2,702,045 | 2/1955 | Graefe | 137/192 |
| 2,832,370 | 4/1958 | Hill | 137/399 |
| 4,025,236 | 5/1977 | Fujiwara | 417/131 |
| 4,192,341 | 3/1980 | Hilmer | 137/192 |
| 4,545,397 | 10/1985 | Yumoto | 137/192 |
| 4,757,837 | 7/1988 | Provost et al. | 137/192 |
| 5,141,405 | 8/1992 | Francart, Jr. | 417/133 |

OTHER PUBLICATIONS

Copy of four-page brochure describing and showing the specifications of Gestra Pump FPS 14 (four different installations), made public Jan. 1993.

Primary Examiner—Richard A. Bertsch
Assistant Examiner—Roland G. McAndrews, Jr.
Attorney, Agent, or Firm—Collard & Roe

[57] ABSTRACT

An automatic liquid pump contained within a sealed pressure vessel. The pressure vessel includes a liquid inlet opening, a liquid outlet opening, a gas inlet and a gas outlet. A preloaded float-operated over-center valve mechanism closes the gas inlet valve and opens the gas outlet valve to permit vapor to vent through the gas outlet valve. The over-center valve mechanism alternately closes the gas outlet valve and opens the gas inlet valve to admit compressed gas into the sealed vessel to evacuate the liquid within the sealed vessel through the liquid outlet opening. A float valve is coupled to the liquid outlet opening for closing the liquid outlet opening when the liquid in the vessel drops below a first predetermined level. As a result, vapors are prevented from escaping through the liquid outlet opening under all operating conditions.

18 Claims, 4 Drawing Sheets

AUTOMATIC LIQUID PUMP WITH VAPOR FLOW PREVENTION FLOW OUTLET VALVE

BACKGROUND OF THE INVENTION

1. Field of the Invention

The present invention relates to a float-operated over-center valve actuating mechanism for a liquid pumping system where a pressure vessel is alternately filled with a liquid and emptied with pump operation controlled by the liquid level within the pressure vessel. More particularly, it relates to a liquid pumping system which incorporates a vapor trap within the vessel on the liquid outlet line.

2. The Prior Art

Over-center float-operated valve actuating mechanisms are known, for example from U.S. Pat. No. 5,141,405 to Francart Jr. Such over-center float-operated valve actuating mechanisms are useful in controlling the filling of a closed or sealed pressure vessel. The vessel includes a vent valve for venting the steam or vapor and a second pressure valve subjected to high pressure inlet fluid, such as live steam at 100-500 psi, to drive an accumulated liquid periodically from the vessel.

During filling of the vessel, the vent valve is in the open position and the pressure valve is closed by the over-center float-operated valve actuating mechanism. As the vessel fills with liquid, the float-operated valve actuating mechanism snaps quickly through the center position, closing the vent valve and simultaneously opening the high pressure inlet valve to pump the accumulated liquid from the vessel. When the liquid level drops below a predetermined level, the float-operated valve actuating mechanism snaps quickly through the center position, opening the vent valve and simultaneously closing the high pressure inlet valve.

A check valve at the liquid outlet opening is ordinarily closed by a liquid outlet pressure which is greater than the liquid inlet pressure. However, a deficiency exists with the prior art automatic pumps, whereby live steam or process gas will pass through the liquid outlet opening when the liquid inlet pressure exceeds the liquid outlet pressure. Therefore, it would be advantageous to provide an automatic liquid pump that prevents the loss of vapor from the pressure vessel when the liquid inlet pressure is greater than the liquid outlet pressure.

SUMMARY OF THE INVENTION

It is therefore an object of the invention to provide an automatic liquid pump which effectively separates vapor from liquid under all process operating conditions.

It is another object of the present invention to provide an automatic liquid pump which prevents the loss of vapor through the liquid outlet opening.

It is yet another object of the present invention to provide an automatic liquid pump which prevents the loss of vapor without requiring additional equipment either before or after the liquid pump.

These and other related objects are achieved according to the invention by an automatic liquid pump contained within a sealed pressure vessel having a bottom and a top. The bottom includes a liquid and vapor inlet opening, coupled to a vapor inlet space, and a liquid outlet opening. The top has a gas inlet adapted to be connected to a compressed gas source, a gas outlet, an inlet valve controlling the gas inlet, and an outlet valve controlling the gas outlet. The pump includes valve actuating means for alternately opening and closing the valves, first opening the gas outlet valve and closing the gas inlet valve, and second, closing the gas outlet valve and opening the gas inlet valve. The pump further includes float valve means operatively coupled to the liquid outlet opening for closing the liquid outlet opening when the liquid in the vessel drops below a first predetermined level so that vaporized liquid is prevented from escaping through the liquid outlet opening.

The pump additionally includes an inlet check valve for controlling the flow of liquid and vapor through the liquid inlet opening. An outlet check valve is located between the float valve means and the liquid outlet opening for controlling the flow of liquid through the liquid outlet opening. The valve actuating means consists of a pre-loaded float-operated over a center valve mechanism. The over-center mechanism is moveable between a first position, in which the gas outlet valve is open, and the gas inlet valve is closed, and a second position, in which the gas outlet valve is closed and the gas inlet valve is open. The over-center valve mechanism snaps into the first position when the liquid in valve is below a second predetermined level. The over-center valve mechanism snaps into the second position when the liquid in the vessel is above a third predetermined level. The second predetermined level and the third predetermined level are both greater than the first predetermined level.

In the second position, compressed gas from the compressed gas source enters the gas inlet to drive the liquid out of the vessel through the outlet check valve, until the liquid level drops below the second predetermined level and the over-center valve mechanism snaps into the first position. In the first position, liquid and liquid vapor enter the vessel through the inlet check valve and establish a liquid inlet pressure within the vessel against the outlet check valve. A liquid outlet pressure exists in the liquid outlet opening against the outlet check valve. In the first position, when the liquid outlet pressure is greater than the liquid inlet pressure, the outlet check valve remains closed and liquid vapor is vented through the gas outlet. In the first position, when the liquid outlet pressure is less than the liquid inlet pressure, liquid is driven out of the vessel through the outlet check valve, until the liquid level drops below the first predetermined level and the float valve means closes the liquid outlet opening. The first predetermined level is above the liquid outlet opening.

The float valve means consists of a bucket steam trap. Alternately, the float valve means may consist of a ball float and a linkage arm coupled to the ball float. In a further embodiment, the float valve means consists of a spherical float member, a cage to confine said spherical float member, and a valve seat configured and designed to receive said spherical float member.

BRIEF DESCRIPTION OF THE DRAWINGS

Other objects and features of the present invention will become apparent from the following detailed description considered in connection with the accompanying drawings which discloses several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
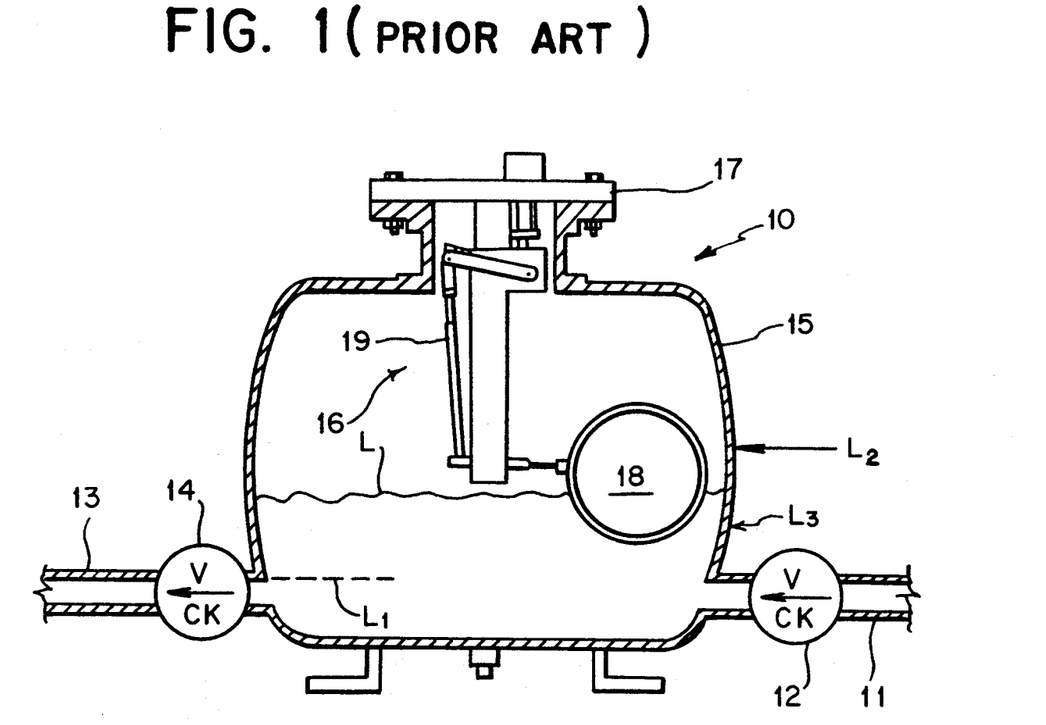
FIG. 1 is a front side elevational view, in part cross section, of an automatic liquid pump according to the prior art.
Figure 2:
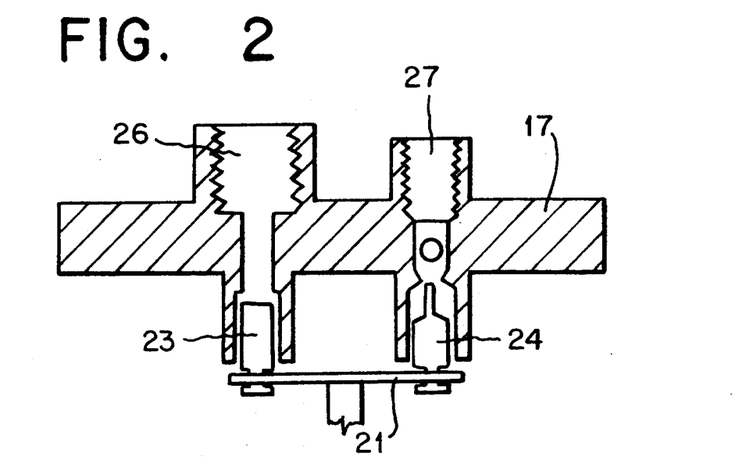
FIG. 2 is an enlarged right side elevational view of a gas outlet valve and a gas inlet valve.

Turning now to the FIGS., and in particular FIG. 1, there is shown a prior art automatic liquid pump 10 having an inlet line 11 and an inlet check valve 12 disposed within inlet line 11. Liquid pump 10 also includes an outlet line 13 and an outlet check valve 14 disposed within outlet line 13. Inlet line 11 and outlet line 13 connect to a closed or sealed pressure vessel 15. Contained within vessel 15 is a float-operated over-center valve actuating mechanism 16 operatively coupled to a top 17 of vessel 15. A float 18 of over-center valve actuating mechanism 16 rises and falls within vessel 15, depending upon the liquid level L. Float 18 is connected by a linkage 19 to a plate 21, as can be seen in FIG. 2. Plate 21 is coupled to an outlet valve 23 and an inlet valve 24. When float 18 is lowered, i.e. by a drop in liquid level L, plate 21 snaps down to close inlet valve 24 and open outlet valve 23 as the mechanism snaps over center. This begins the "fill" phase. In this manner, liquid and vapor can flow in through inlet line 11, with the vapor being vented through outlet valve 23 to gas outlet 26. Gas outlet 26 is an equalizing line that returns to the inlet vapor space which drains to inlet line 11. Gas outlet 26 may also be connected to an air vent. As long as the liquid level is above level $L_1$, a liquid seal is maintained at outlet line 13.

When the liquid level L rises above a second predetermined level $L_2$, float 18 rises and the mechanism snaps over center, causing plate 21 to move up to close outlet valve 23, and open inlet valve 24. A source of compressed gas, which is not shown in the FIG., is coupled to gas inlet 27. The compressed gas expands into vessel 15 to drive out the liquid through outlet line 13. This is the "pump" phase. As liquid level L drops below a third predetermined level $L_3$, float 18 lowers and the mechanism snaps plate 21 back down to open outlet valve 23 and close inlet valve 24. The "fill" phase starts over with vapor and liquid entering vessel 15 through inlet line 11 until liquid level L reaches the second predetermined level. As long as outlet check valve 14 is closed due to a higher liquid outlet pressure during the "fill" phase, the liquid level L will remain between $L_2$ and $L_3$.

However, when the liquid inlet pressure exceeds the liquid outlet pressure, outlet check valve 14 will open and liquid level L will continue to drop. The liquid inlet pressure is not relieved through gas outlet 26 since gas outlet 26 returns to the inlet vapor space. Once the liquid seal is lost over outlet line 13, i.e. liquid level below $L_1$, then vapor will pass through outlet check valve 14 into said outlet line. When this occurs, liquid pump 10 has failed to separate liquid from vapor and additional external equipment may be required to separate out the vapor.

Figure 3:
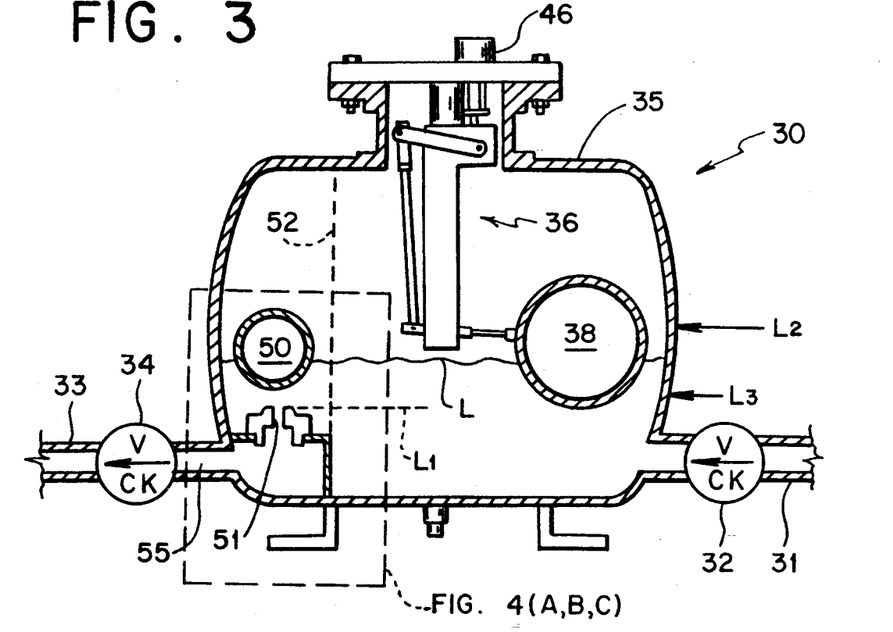
FIG. 3 is a front side elevational view, in part cross section, of a first embodiment of the automatic liquid pump according to the invention.

Referring now to FIG. 3, there is shown a liquid pump 30 according to the invention having an inlet line 31 and an inlet check valve 32 which admits liquid and vapor into a vessel 35. A float 38 forming part of an over-center valve actuating mechanism 36 pumps liquid out through outlet check valve 34 and outlet line 33 once the liquid level L rises above the second predetermined level. As liquid level L drops below the third predetermined level, float 38 returns to its "fill" position. The liquid level will remain at or above the first predetermined level as long as the liquid outlet pressure is greater than the liquid inlet pressure, i.e., outlet check valve 34 remains closed. Under these operating conditions, a liquid seal is maintained at outlet line 33 with vapor or process gases being vented through gas outlet 46. Valve actuating mechanism 36 may be designed similarly to the Valve Actuating Mechanism disclosed in U.S. Pat. No. 5,141,405, the subject matter of which is incorporated herein by reference thereto.

Liquid pump 30 additionally includes a spherical body 50 and a seat 51 for receiving spherical body 50. A cage 52, which is placed across part of vessel 35, contains spherical body 50 so that it is generally over seat 51. Cage 52 is dimensioned to permit vertical motion of spherical body 50, dependent on the water level, and to restrict horizontal movement so that spherical body 50 always remains substantially over seat 51. If the liquid level approaches $L_1$, i.e., liquid inlet pressure is greater than liquid outlet pressure, spherical body 50 engages seat 51 and a seal is maintained on outlet line 33. Vapor or process gas must vent through gas outlet 46 under these conditions. Once the liquid level rises above $L_1$, spherical body 50 is lifted off seat 51 so that pump 30 can pump out liquid once the liquid level reaches $L_2$. A float valve assembly as described in U.S. Pat. No. 4,545,397, the subject matter of which is incorporated herein by reference thereto, may be used in place of spherical body 50 and seat 51.

Figure 4A:
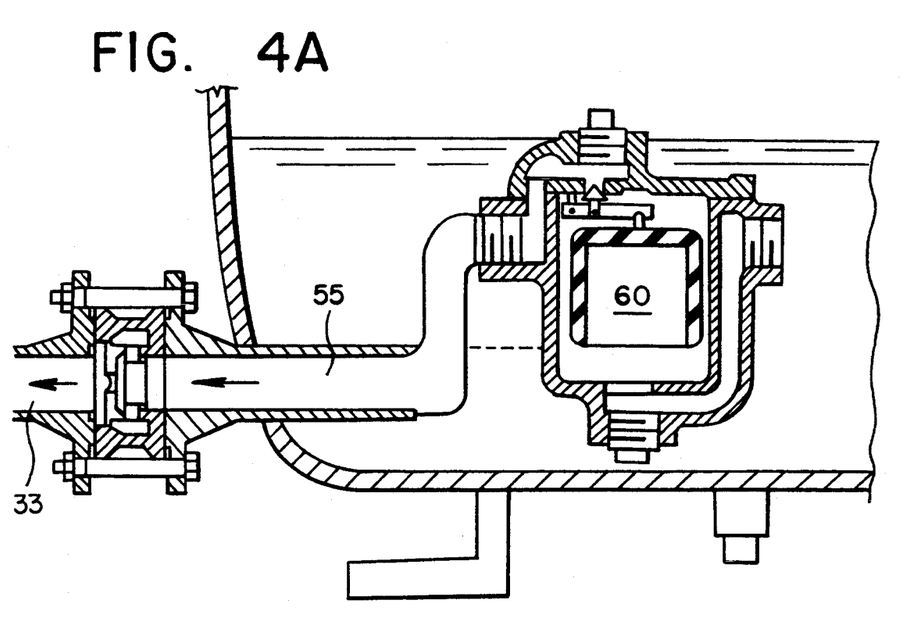
FIG. 4A is an enlarged front side elevational view, in cross section, showing a second embodiment of the float valve of the automatic liquid pump of FIG. 3.
Figure 4B:
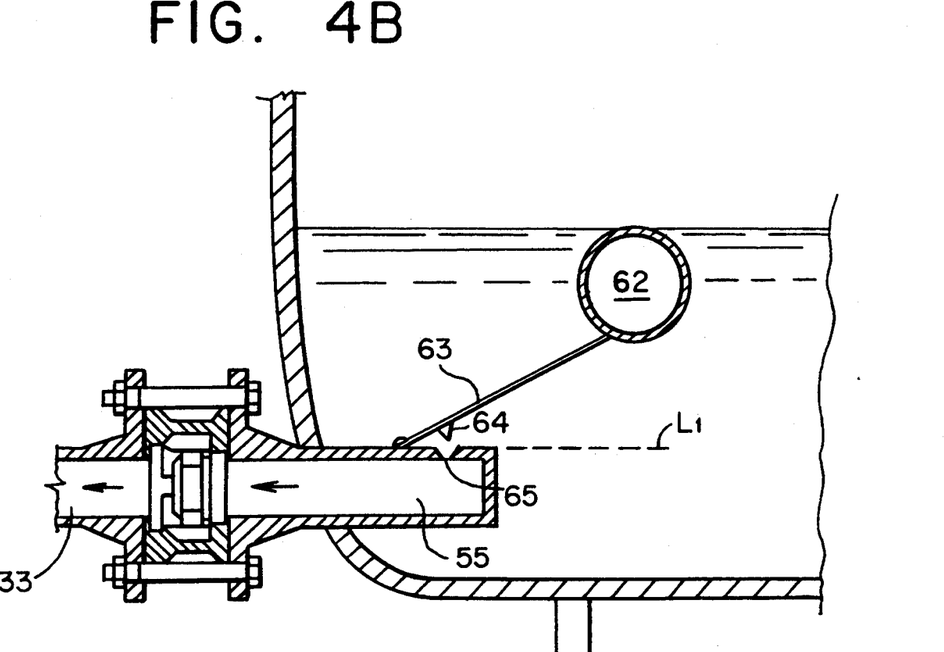
FIG. 4B is an enlarged front side elevational view of a third embodiment of the float valve of the automatic liquid pump of FIG. 3.

FIG. 4A shows an inverted bucket float 60 which closes outlet line 33 before the liquid level reaches $L_1$. FIG. 4B shows a float 62, a linkage arm 63 and a valve 64 which closes outlet line 33 before the liquid level reaches $L_1$. Valve body 64 seats or comes to rest on correspondingly shaped valve seat 65 in outlet conduit 55.

Figure 4C:
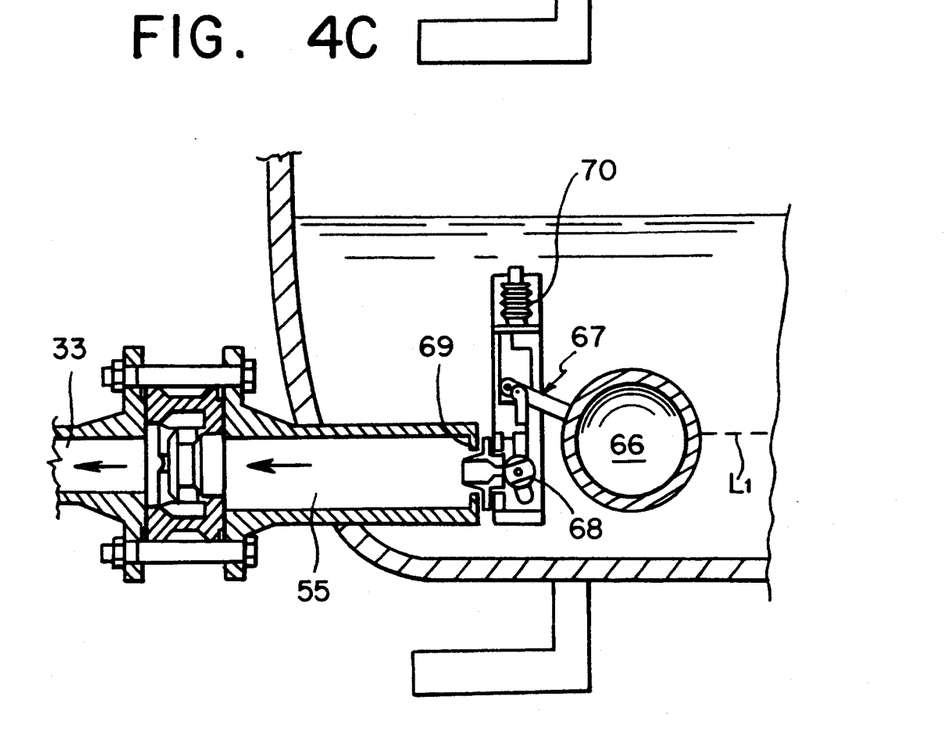
FIG. 4C is an enlarged front side elevational view in cross section of a fourth embodiment of the float valve of the automatic liquid pump of FIG. 3.

FIG. 4C shows a float 66 with linkage 67 which closes outlet line 33 before the liquid level reaches $L_1$. A valve member 68 rolls across valve seat 69 in the end of outlet conduit 55. A thermostatic bellows 70 is optionally coupled to the top of linkage 67. Once equipped with thermostatic bellows 70, the valve has three modes of operation. First, in the presence of water and/or condensate, float 66 rises due to buoyancy and valve member 68 is open. Second, in the presence of steam with no condensate, float 66 drops and valve member 68 closes across valve seats 69. Third, in the presence of air with no condensate, thermostatic bellows 70 contracts due to the cool temperature of the air. This contraction of thermostatic bellows 70 lifts linkage 67 and opens valve member 68. Thermostatic bellows 70 is used where a steam trap is needed during one phase of a batch process and an air vent is needed during another phase.

Figure 5A:
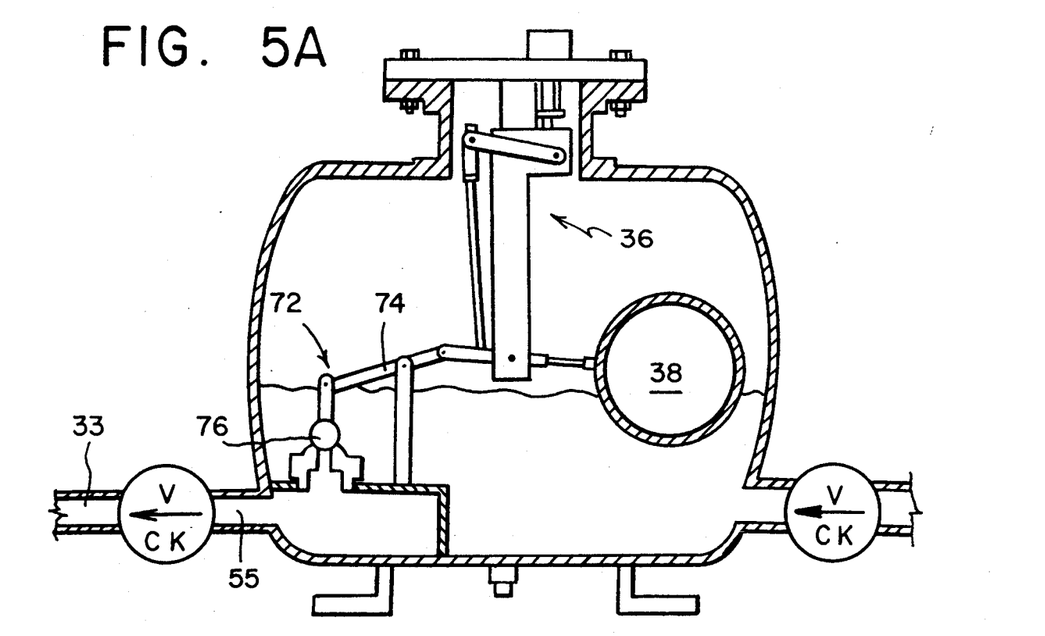
FIG. 5A is a front side elevational view, in part cross section, of a second embodiment of the automatic liquid pump of the invention with the float in the "fill" position.
Figure 5B:
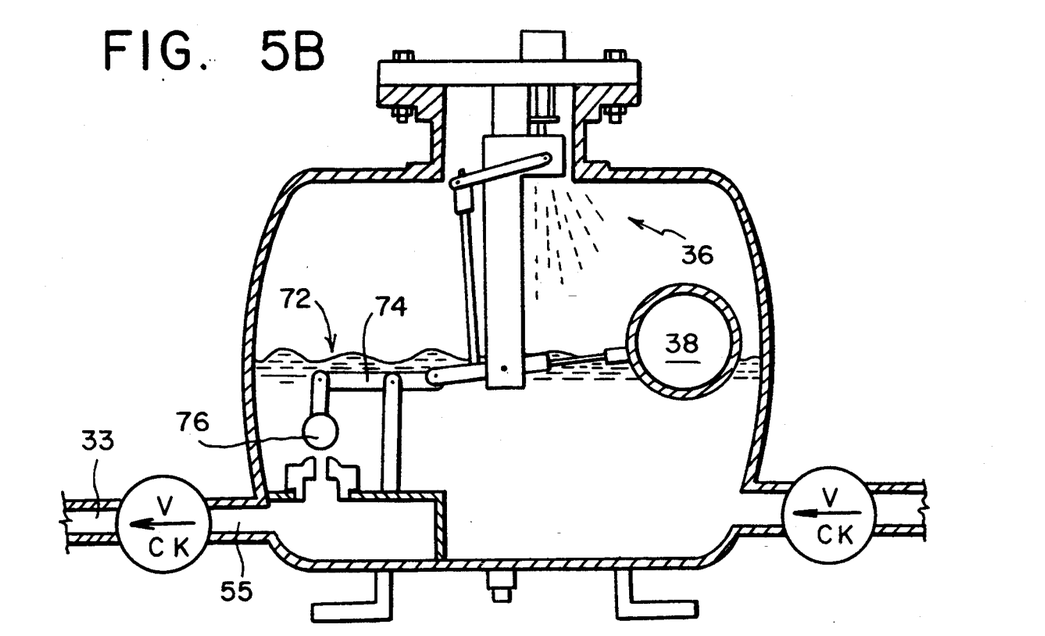
FIG. 5B is a front side elevational view of the embodiment of FIG. 5A, in part cross section, with the float in the "pump" position.

FIGS. 5A and 5B show an alternate embodiment of automatic liquid pump 30, where float 38 of over-center valve actuating mechanism 36 also controls valve assembly 72 on outlet conduit 55. In FIG. 5A liquid pump 30 is in "fill" mode where linkage 74 and valve member 76 maintain a seal on outlet conduit 55. In FIG. 5B, the increased liquid level has moved float 38 upward to "pump" mode. At the same time, linkage 74 has retracted valve member 76 so that the accumulated liquid can be pumped out through outlet conduit 55.

In each of the embodiments of FIGS. 3, 4A, 4B, 4C, 5A and 5B there is shown a vessel outlet conduit 55. It should be noted that liquid level $L_1$ in each embodiment is above the top of vessel outlet conduit 55. Accordingly, either a liquid seal or a valve seal (from components 50, 60, 64, 68 or 76) is maintained across valve outlet conduit 55 at all times. Thus, liquid pump 30 will only discharge liquid through outlet line 33, unless thermostatic bellows 70 is venting air with no condensate. It should be understood that the valve mechanism at vessel outlet conduit 55 can be any float-type of device, with or without a linkage. In addition, any other type of valve can be utilized which would close off vessel outlet conduit 55 once the liquid level drops below $L_1$.

While several embodiments of the present invention have been shown and described, it is to be understood that many changes and modifications may be made thereunto without departing from the spirit and scope of the invention as defined in the appended claims.

What is claimed is:

1. An automatic liquid pump having a sealed pressure vessel with a bottom and a top, the bottom including a vapor and liquid inlet opening having an inlet pressure and a liquid outlet opening having an outlet pressure, the top having a gas inlet adapted to be connected to a compressed gas source, a gas outlet, a gas inlet valve controlling the gas inlet, and a gas outlet valve controlling the gas outlet, and a gas valve actuator for alternately opening and closing the valves, first opening the gas outlet valve and closing the gas inlet valve and second closing the gas outlet valve and opening the gas inlet valve, said automatic liquid pump comprising:

means connecting the gas outlet to the vapor and liquid inlet opening, a valve operatively coupled to the liquid outlet opening, the liquid outlet opening being below a first predetermined level, said valve selectively:

(i) operating as a steam trap by closing the liquid outlet opening in the presence of steam when the inlet pressure exceeds the outlet pressure and the liquid in the vessel drops below the first predetermined level so that steam is prevented from escaping through the liquid outlet opening;

(ii) operating as an air vent by opening the liquid outlet opening in the presence of cool air when the inlet pressure exceeds the outlet pressure and the liquid in the vessel drops below the first predetermined level so that cool air escapes through the liquid outlet opening; and (iii) opening the liquid outlet opening in the presence of a condensate.

2. The automatic liquid pump according to claim 1, additionally comprising:

an inlet check valve for controlling the flow of vapor and liquid through the vapor and liquid inlet opening into the pressure vessel; and an outlet check valve, located between said valve and the liquid outlet opening, for controlling the flow of liquid from the pressure vessel through the liquid outlet opening.

3. The automatic liquid pump according to claim 2, wherein the gas valve actuator comprises a preloaded float-operated over-center valve mechanism moveable between a first fill position, in which the gas outlet valve is open and the gas inlet valve is closed, and a second pump position, in which the gas outlet valve is closed and the gas inlet valve is open.

4. The automatic liquid pump according to claim 3, wherein said over-center valve mechanism snaps into said second pump position when the liquid in the vessel is above a second predetermined level; and said over-center valve mechanism snaps into said first fill position when the liquid in the vessel is below a third predetermined level.

5. An automatic liquid pump having a sealed pressure vessel with a bottom and a top, the bottom including a vapor and liquid inlet opening and a liquid outlet opening, the top having a gas inlet adapted to be connected to a compressed gas source, a gas outlet, a gas inlet valve controlling the gas inlet, and a gas outlet valve controlling the gas outlet, and a gas valve actuator for alternately opening and closing the valves, first opening the gas outlet valve and closing the gas inlet valve and second closing the gas outlet valve and opening the gas inlet valve, said automatic liquid pump comprising:

a valve operatively coupled to the liquid outlet opening for closing the liquid outlet opening when the liquid in the vessel drops below a first predetermined level so that vapor is prevented from escaping through the liquid outlet opening;

an inlet check valve for controlling the flow of vapor and liquid through the vapor and liquid inlet opening into the pressure vessel; and an outlet check valve, located between said valve and the liquid outlet opening, for controlling the flow of liquid from the pressure vessel through the liquid outlet opening, wherein the gas valve actuator comprises a preloaded float-operated over-center valve mechanism moveable between a first fill position, in which the gas outlet valve is open and the gas inlet valve is closed, and a second pump position, in which the gas outlet valve is closed and the gas inlet valve is open, wherein said over-center valve mechanism snaps into said second pump position when the liquid in the vessel is above a second predetermined level, said over-center valve mechanism snaps into said fist fill position when the liquid in the vessel is below a third predetermined level, and wherein said second predetermined level and said third predetermined level are both greater than said first predetermined level.

6. The automatic liquid pump according to claim 5, wherein in said second pump position compressed gas from the compressed gas source enters the gas inlet to drive the liquid out of the vessel through the outlet check valve, until the liquid level drops below said third predetermined level and said over-center valve mechanism snaps into said first fill position.

7. The automatic liquid pump according to claim 6, wherein in said first fill position liquid and vapor enter the vessel through said inlet check valve and establish a liquid inlet pressure within the vessel against said outlet check valve; wherein a liquid outlet pressure exists in said liquid outlet opening against said outlet check valve.

8. The automatic liquid pump according to claim 7, wherein in said first fill position when said liquid outlet pressure is greater than said liquid inlet pressure, said outlet check valve remains closed and vapor is vented through said gas outlet.

9. The automatic liquid pump according to claim 8, wherein in said first fill position when said liquid outlet pressure is less than said liquid inlet pressure, liquid is driven out of the vessel through said outlet check valve, until the liquid level drops below said first predetermined level and said valve closes said liquid outlet opening.

10. The automatic liquid pump according to claim 9, wherein said first predetermined level is above said liquid outlet opening.

11. The automatic liquid pump according to claim 10, wherein said valve comprises a bucket steam trap.

12. The automatic liquid pump according to claim 10, wherein said valve comprises a ball float and a linkage arm coupled to said ball float.

13. The automatic liquid pump according to claim 10, wherein said valve comprises a spherical float member, a cage confining said spherical float member while permitting free essentially vertical movement of said float member, and a valve seat configured and designed to receive and accommodate said spherical float member.

14. An automatic liquid pump having a sealed pressure vessel with a bottom and a top, the bottom including a vapor and liquid inlet opening and a liquid outlet opening, the top having a gas inlet adapted to be connected to a compressed gas source, a gas outlet, a gas inlet valve controlling the gas inlet, and a gas outlet valve controlling the gas outlet, and a gas valve actuator for alternately opening and closing the valves, first opening the gas outlet valve and closing the gas inlet valve and second closing the gas outlet valve and opening the gas inlet valve, said automatic liquid pump comprising:
  a valve operatively coupled to the liquid outlet opening for closing the liquid outlet opening when the liquid in the vessel drops below a first predetermined level so that vapor is prevented from escaping through the liquid outlet opening; and
  a linkage coupled between said gas valve actuator and said valve for controlling operation of said valve based upon said gas valve actuator.

15. The automatic liquid pump according to claim 5, wherein said linkage closes said valve across the liquid outlet opening when said gas valve actuator closes the gas inlet valve and said linkage opens said valve of the liquid outlet opening when said gas valve actuator opens the gas inlet valve.

16. An automatic liquid pump comprising:
  a sealed pressure vessel having a bottom and a top, a liquid and vapor inlet line and a liquid outlet line, both connected to said bottom, said top having a gas inlet adapted to be connected to a compressed gas source, a gas outlet, an inlet valve controlling the gas inlet, and an outlet valve controlling the gas outlet;
  a preloaded float-operated over-center valve mechanism for alternately opening and closing said valves, first opening said gas outlet valve and closing said gas inlet valve and second closing said gas outlet valve and opening said gas inlet valve;
  an inlet check valve located within said liquid and vapor inlet line for controlling the flow of liquid and vapor through said liquid and vapor inlet line into said sealed pressure vessel;
  an outlet check valve located within said liquid outlet line for controlling the flow of liquid from said sealed pressure vessel through said liquid outlet line, said outlet check valve having a vessel side and an opposite side;
  said liquid outlet line including a liquid outlet opening with a top disposed within said vessel;
  said top defining a minimum liquid level, a liquid seal formed at said liquid outlet opening when the liquid level is above said minimum liquid level; and
  a float, a linkage connected to said float, and a valve coupled to said linkage for opening and closing said liquid outlet opening, wherein said float closes said valve before the liquid in said vessel reaches said minimum liquid level so that vapor is prevented from escaping from said vessel through said liquid outlet line when the internal pressure on said vessel side of said liquid outlet check valve exceeds the external pressure on said opposite side of said liquid outlet check valve.

17. An automatic liquid pump comprising:
  a sealed pressure vessel having a bottom and a top, a liquid and vapor inlet line coupled to an inlet space and a liquid outlet line, both connected to said bottom, said top having a gas inlet adapted to be connected to a compressed gas source, a gas outlet coupled to the inlet space, an inlet valve controlling the gas inlet, and a gas outlet valve controlling the gas outlet;
  a preloaded float-operated over-center valve mechanism for alternately opening and closing said valves, first opening said gas outlet valve and closing said gas inlet valve and second closing said gas outlet valve and opening said gas inlet valve;
  an inlet check valve located within said liquid and vapor inlet line for controlling the flow of liquid and vapor through said liquid and vapor inlet line into said sealed pressure vessel;
  an outlet check valve located within said liquid outlet line for controlling the flow of liquid from said sealed pressure vessel through said liquid outlet line, said outlet check valve having a vessel side and an opposite side;
  said liquid outlet line including a liquid outlet opening with a top disposed within said vessel;
  said top defining a minimum liquid level, a liquid seal formed at said liquid outlet opening when the liquid level is above said minimum liquid level; and
  a linkage coupled to said over-center valve mechanism and an outlet valve coupled to said linkage for opening and closing said liquid outlet line, wherein said over-center valve mechanism alternately opens and closes said outlet valve corresponding to said opening and closing of said gas inlet valve, so that vapor is prevented from escaping from said vessel through said liquid outlet line when said gas inlet valve is closed and the internal pressure on said vessel side of said liquid outlet check valve exceeds the external pressure on said opposite side of said liquid outlet check valve.

18. An automatic liquid pump comprising:
a sealed pressure vessel with a bottom and a top, said bottom including a vapor and liquid opening and a liquid outlet opening, said top having a gas inlet adapted to be connected to a compressed gas source, a gas outlet, a gas inlet valve controlling the gas inlet, and a gas outlet valve controlling said gas outlet;
filling and discharging means for alternately opening and closing the valves, first, opening said gas outlet valve and closing said gas inlet valve and second, closing said gas outlet valve and opening said gas inlet valve;
valve means operatively coupled to said liquid outlet opening for opening and closing said liquid outlet opening so that vapor is prevented from escaping through said liquid outlet opening,
said valve means comprising a spherical float member, a cage confining said spherical float member while permitting free essentially vertical movement of said float member within said sealed pressure vessel, and a valve seat configured and designed to receive and form a seal with said spherical float member.

* * * * *

UNITED STATES PATENT AND TRADEMARK OFFICE
CERTIFICATE OF CORRECTION

PATENT NO. : 5,366,349
DATED : NOVEMBER 22, 1994
INVENTOR(S) : EDMOND ILG

It is certified that error appears in the above-identified patent and that said Letters Patent is hereby corrected as shown below:

Column 6, line 59, delete "fist" and insert —first—.

Column 7, line 57, delete "5" and insert —14—.

Signed and Sealed this

Twenty-ninth Day of August, 1995

Attest:

BRUCE LEHMAN

*Attesting Officer*  *Commissioner of Patents and Trademarks*

REEXAMINATION CERTIFICATE (3900th)

United States Patent [19]

Ilg

[11] B1 5,366,349
[45] Certificate Issued  Oct. 12, 1999

[54] AUTOMATIC LIQUID PUMP WITH VAPOR FLOW PREVENTION FLOW OUTLET VALVE

[75] Inventor: Edmond Ilg, Ridgefield Park, N.J.

[73] Assignee: Gestra, Inc., Caldwell, N.J.

Reexamination Requests:
No. 90/004,276, Jun. 14, 1996
No. 90/004,825, Nov. 4, 1997

Reexamination Certificate for:
Patent No.: 5,366,349
Issued: Nov. 22, 1994
Appl. No.: 08/083,650
Filed: Jun. 25, 1993

Certificate of Correction issued Aug. 29, 1995.

[51] Int. Cl.$^6$ ............................. F04F 1/06; F04B 21/02
[52] U.S. Cl. ........................ 417/132; 417/135; 137/399
[58] Field of Search ................................ 417/132, 135; 137/399

[56] References Cited

U.S. PATENT DOCUMENTS 1,207,679  12/1916  Boylan .
1,406,157  2/1922  Coulombe .
1,583,461  5/1926  Harvey .

FOREIGN PATENT DOCUMENTS 26407  of 1911  United Kingdom .
12349  of 1915  United Kingdom .

*Primary Examiner*—Charles G. Freay

[57] ABSTRACT

An automatic liquid pump contained within a sealed pressure vessel. The pressure vessel includes a liquid inlet opening, a liquid outlet opening, a gas inlet and a gas outlet. A preloaded float-operated over-center valve mechanism closes the gas inlet valve and opens the gas outlet valve to permit vapor to vent through the gas outlet valve. The over-center valve mechanism alternately closes the gas outlet valve and opens the gas inlet valve to admit compressed gas into the sealed vessel to evacuate the liquid within the sealed vessel through the liquid outlet opening. A float valve is coupled to the liquid outlet opening for closing the liquid outlet opening when the liquid in the vessel drops below a first predetermined level. As a result, vapors are prevented from escaping through the liquid outlet opening under all operating conditions.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 10–19:

FIGS. 5A and 5B show an alternate embodiment of automatic liquid pump 30, where float 38 of over-center valve actuating mechanism 36 also controls assembly 72 on outlet conduit 55. In FIG. 5A liquid pump 30 is in "fill" mode where linkage 74 and valve member 76 maintain a seal on outlet conduit 55. In FIG. 5B, the increased liquid level has moved float 38 upward to "pump" mode. At the same time, *generally horizontal* linkage 74 has retracted valve member 76 so that the accumulated liquid can be pumped out through outlet conduit 55.

AS A RESULT OF REEXAMINATION, IT HAS BEEN DETERMINED THAT:

The patentability of claims 1–4 and 18 is confirmed.

Claims 5–10 are cancelled.

Claims 11–14 and 16 and 17 are determined to be patentable as amended.

Claim 15 dependent on an amended claim, is determined to be patentable.

11. [The] *An* automatic liquid pump [according to claim 10,] *having a sealed pressure vessel with a bottom and a top, the bottom including a vapor and liquid inlet opening and a liquid outlet opening, the top having a gas inlet adapted to be connected to a compressed gas source, a gas outlet, a gas inlet valve controlling the gas inlet, and a gas outlet valve controlling the gas outlet, and a gas valve actuator for alternately opening and closing the valves, first opening the gas outlet valve and closing the gas inlet valve and second closing the gas outlet valve and opening the gas inlet valve, said automatic liquid pump comprising:*
  *a valve operatively coupled to the liquid outlet opening for closing the liquid outlet opening when the liquid in the vessel drops below a first predetermined level so that vapor is prevented from escaping through the liquid outlet opening;*
  *an inlet check valve for controlling the flow of vapor and liquid through the vapor and liquid inlet opening into the pressure vessel; and*
  *an outlet check valve, located between said valve and the liquid outlet opening, for controlling the flow of fluid from the pressure vessel through the liquid outlet opening,*
  *wherein the gas valve actuator comprises a preloaded float-operated over-center valve mechanism moveable between a first fill position, in which the gas outlet valve is open and the gas inlet valve is closed, and a second pump position, in which the gas outlet valve is closed and the gas inlet valve is open,*
  *wherein said over-center valve mechanism snaps into said second pump position when the liquid in the vessel is above a second predetermined level,*
  *said over-center valve mechanism snaps into said first fill position when the liquid in the vessel is below a third predetermined level,*
  *wherein said second predetermined level and said third predetermined level are both greater than said first predetermined level,*
  *wherein in said second pump position compressed gas from the compressed gas source enters the gas inlet to drive the liquid out of the vessel through the outlet check valve, until the liquid level drops below said third predetermined level and said over-center valve mechanism snaps into said first fill position;*
  *wherein in said first fill position liquid and vapor enter the vessel through said inlet check valve and establish a liquid inlet pressure within the vessel against said outlet check valve; wherein a liquid outlet pressure exists in said liquid outlet opening against said outlet check valve;*
  *wherein in said first fill position when said liquid outlet pressure is greater than said liquid inlet pressure, said outlet check valve remains closed and vapor is vented through said gas outlet;*
  *wherein in said first fill position when said liquid outlet pressure is less than said liquid inlet pressure, liquid is driven out of the vessel through said outlet check valve, until the liquid level drops below said first predetermined level and said valve closes said liquid outlet opening;*
  *wherein said first predetermined level is above said liquid outlet opening; and*
  wherein said valve comprises a bucket steam trap.

12. The automatic liquid pump according to [claim 10] *claim 11*, wherein said valve comprises a ball float and a linkage arm coupled to said ball float.

13. [The] *An* automatic liquid pump [according to claim 10,] *having a sealed pressure vessel with a bottom and a top, the bottom including a vapor and liquid inlet opening and a liquid outlet opening, the top having a gas inlet adapted to be connected to a compressed gas source, a gas outlet, a gas inlet valve controlling the gas inlet, and a gas outlet valve controlling the gas outlet, and a gas valve actuator for alternately opening and closing the valves, first openin the gas outlet valve and closing the gas inlet valve and second closing the gas outlet valve and opening the gas inlet valve, said automatic liquid pump comprising:*
  *a valve operatively coupled to the liquid outlet opening for closing the liquid outlet opening when the liquid in the vessel drops below a first predetermined level so that vapor is prevented from escaping through the liquid outlet opening;*
  *an inlet check valve for controlling the flow of vapor and liquid through the vapor and liquid inlet opening into the pressure vessel; and liquid outlet opening, for controlling the flow of liquid from the pressure vessel through the liquid outlet opening;*
  *wherein the gas valve actuator comprises a preloaded float-operated over-center valve mechanism moveable between a first fill position, in which the gas outlet valve is open and the gas inlet valve is closed, and a* second pump position, in which the gas outlet valve is closed and the gas inlet valve is open, wherein said over-center valve mechanism snaps into said second pump position when the liquid in the vessel is above a second predetermined level, said over-center valve mechanism snaps into said first fill position when the liquid in the vessel is below a third predetermined level, wherein said second predetermined level and said third predetermined level are both greater than said first predetermined level;

wherein in said second pump position compressed gas from the compressed gas source enters the gas inlet to drive the liquid out of the vessel through the outlet check valve, until the liquid level drops below said third predetermined level and said over-center valve mechanism snaps into said first fill position;

wherein in said first fill position liquid and vapor enter the vessel through said inlet check valve and establish a liquid inlet pressure within the vessel against said outlet check valve; wherein a liquid outlet pressure exists in said liquid outlet opening against said outlet check valve;

wherein in said first fill position when said liquid outlet pressure is greater than said liquid inlet pressure, said outlet check valve remains closed and vapor is vented through said gas outlet;

wherein in said first fill position when said liquid outlet pressure is less than said liquid inlet pressure, liquid is driven out of the vessel through said outlet check valve, until the liquid level drops below said first predetermined level, and said valve closes said liquid outlet opening;

wherein said first predetermined level is above said liquid outlet opening; and wherein said valve comprises a spherical float member, a cage confining said spherical float member while permitting free essentially vertical movement of said first member, and a valve seat configured and designed to receive and accommodate said spherical float member.

14. An automatic liquid pump having a sealed pressure vessel with a bottom and a top, the bottom including a vapor and liquid inlet opening and a liquid outlet opening, the top having a gas inlet adapted to be connected to a compressed gas source, a gas outlet, a gas inlet valve controlling the gas inlet, and a gas outlet valve controlling the gas outlet, and a gas valve actuator for alternately opening and closing the valve, first opening the gas outlet valve and closing the gas inlet valve and second closing the gas outlet valve and opening the gas inlet valve, said automatic liquid pump comprising:

means connecting the gas outlet to the vapor and liquid inlet opening, a valve operatively coupled to the liquid outlet opening for closing the liquid outlet opening when the liquid in the vessel drops below a first predetermined level so that vapor is prevented from escaping through the liquid outlet opening, and a *generally horizontal* linkage coupled between said gas valve actuator and said valve for controlling operation of said valve based upon said gas valve actuator.

16. An automatic liquid pump comprising:

a sealed pressure vessel having a bottom and a top, a liquid and vapor inlet line having a vapor and liquid inlet opening, and a liquid outlet line, both connected to said bottom, said top having a gas inlet adapted to be connected to a compressed gas source, a gas outlet, an inlet valve controlling the gas inlet, and an outlet valve controlling the gas outlet;

means connecting the gas outlet to the vapor and liquid inlet opening, a preloaded float-operated over-center valve mechanism for alternately opening and closing said valves, first opening said gas outlet valve and closing said gas inlet valve and second closing said gas outlet valve and opening said gas inlet valve;

an inlet check valve located within said liquid and vapor inlet line for controlling the flow of liquid and vapor through said liquid and vapor inlet line into said sealed pressure vessel;

an outlet check valve located within said liquid outlet line for controlling the flow of liquid from said sealed pressure vessel through said liquid outlet line, said outlet check valve having a vessel side and an opposite side;

said liquid outline line including a liquid outlet opening with a top disposed within said vessel;

said top defining a minimum liquid level, a liquid seal fomed at said liquid outlet opening when the liquid is above said minimum liquid level; and a float, a *generally horizontal* linkage connected to said float, and a valve coupled to said *generally horizontal* linkage for opening and closing said liquid outlet opening, wherein said float closes said valve before the liquid in said vessel reaches said minimum liquid level so that vapor is prevented from escaping from said vessel through said liquid outlet line when the internal pressure on said vessel side of said liquid outlet check valve exceeds the external pressure on said opposite side of said liquid outlet check valve.

17. An automatic liquid pump comprising:

a sealed pressure vessel having a bottom and a top, a liquid and vapor inlet line *having a vapor and liquid inlet opening, and* coupled to an inlet space and a liquid outlet line, both connected to said bottom, said top having a gas inlet adapted to be connected to a compressed gas source, a gas outlet coupled to the inlet space, an inlet valve controlling the gas inlet, and a gas outlet valve controlling the gas outlet;

*means connecting the gas outlet to the vapor and liquid inlet opening,* a preloaded float-operated over-center valve mechanism for alternately opening and closing said valves, first opening said gas outlet valve and closing said gas inlet valve and second closing said gas outlet valve and opening said gas inlet valve;

an inlet check valve located within said liquid and vapor inlet line for controlling the flow of liquid and vapor through said liquid and vapor inlet line into said sealed pressure vessel;

an outlet check valve located within said liquid outlet line for controlling the flow of liquid from said sealed pressure vessel through said liquid outlet line, said outlet check valve having a vessel side and an opposite side;

said liquid outlet line including a liquid outlet opening with a top disposed within said vessel;

said top defining a minimum liquid level, a liquid seal formed at said liquid outlet opening when the liquid level is above said minimum liquid level; and a linkage coupled to said over-center valve mechanism and an outlet valve coupled to said linkage for opening and closing said liquid outlet line, wherein said over-center valve mechanism alternately opens and closes said outlet valve corresponding to said opening and closing of said gas inlet valve, so that vapor is prevented from escaping from said vessel through said liquid outlet line when said gas inlet valve is closed and the internal pressure on said vessel side of said liquid outlet check valve exceeds the external pressure on said opposite side of said liquid outlet check valve.

* * * * *